US009626068B2

(12) United States Patent
Maloney

(10) Patent No.: US 9,626,068 B2
(45) Date of Patent: Apr. 18, 2017

(54) AUTOMATED SYSTEM FOR ORGANIZING PRESENTATION SLIDES

(71) Applicant: Microsoft Corporation, Redmond, WA (US)

(72) Inventor: Christopher Maloney, San Francisco, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 70 days.

(21) Appl. No.: 13/911,833

(22) Filed: Jun. 6, 2013

(65) Prior Publication Data

US 2014/0365897 A1    Dec. 11, 2014

(51) Int. Cl.
*G06F 3/048* (2013.01)
*G06F 3/0481* (2013.01)
*G06F 17/22* (2006.01)
*G06F 17/24* (2006.01)
*G06F 17/30* (2006.01)

(52) U.S. Cl.
CPC ........ *G06F 3/0481* (2013.01); *G06F 17/2229* (2013.01); *G06F 17/2241* (2013.01); *G06F 17/24* (2013.01); *G06F 17/30017* (2013.01); *G06F 17/30056* (2013.01)

(58) Field of Classification Search
CPC ...... G11B 27/034; G06F 17/24; G06F 3/0481
See application file for complete search history.

(56) References Cited

U.S. PATENT DOCUMENTS

| | | | | |
|---|---|---|---|---|
| 5,917,480 A | * | 6/1999 | Tafoya | G06T 1/00 715/732 |
| 6,008,807 A | * | 12/1999 | Bretschneider | G06F 3/0485 715/732 |
| 6,834,371 B1 | * | 12/2004 | Jensen | G06F 17/30017 707/E17.009 |
| 7,546,533 B2 | * | 6/2009 | Sareen et al. | 715/732 |
| 7,707,503 B2 | * | 4/2010 | Good et al. | 715/732 |
| 7,711,722 B1 | | 5/2010 | Sahasi et al. | |
| 7,979,801 B2 | * | 7/2011 | Krishnaswamy et al. | 715/730 |
| 7,987,423 B2 | * | 7/2011 | Wu et al. | 715/704 |

(Continued)

FOREIGN PATENT DOCUMENTS

| | | |
|---|---|---|
| WO | 2012/031167 A1 | 3/2012 |
| WO | 2013/037009 A1 | 3/2013 |

OTHER PUBLICATIONS

Jacobs, Kathy, "Use Hyperlinks in Self-Running Presentations", Retrieved on: Mar. 26, 2013, Available at: http://office.microsoft.com/en-in/powerpoint-help/use-hyperlinks-in-self-running-presentations-HA001129824.aspx.
"Create and Present a Custom Show", Retrieved on: Mar. 26, 2013, Available at: http://office.microsoft.com/en-gb/powerpoint-help/create-and-present-a-custom-show-HA010096698.aspx.
"Creating PowerPoint Slide Shows", Published on: May 5, 2005, Available at: http://www.duluth.umn.edu/~hrallis/guides/PP/slideshow.html.

(Continued)

*Primary Examiner* — David Phantana Angkool
(74) *Attorney, Agent, or Firm* — Merchant & Gould P.C.

(57) ABSTRACT

A method and system for organizing slides and providing navigational elements within the slides using a presentation application is provided. The presentation application automatically generates an organized set of linkable slides corresponding to subheadings provided by the creator. Prompting a presentation creator to initially consider the presentation structure and provide subheadings that relate to broad concepts within the presentation assists in preventing a potential massive reorganization of the presentation after content has been added.

20 Claims, 17 Drawing Sheets

(56) References Cited

U.S. PATENT DOCUMENTS

| | | | |
|---|---|---|---|
| 8,041,724 B2* | 10/2011 | Bhogal | G11B 27/034 707/758 |
| 8,219,914 B2* | 7/2012 | Rauber et al. | 715/730 |
| 8,452,640 B2* | 5/2013 | Kumar et al. | 705/7.32 |
| 8,775,918 B2* | 7/2014 | Livshin et al. | 715/202 |
| 2005/0154995 A1 | 7/2005 | Miller et al. | |
| 2007/0186167 A1* | 8/2007 | Anderson | 715/730 |
| 2008/0115064 A1* | 5/2008 | Roach et al. | 715/730 |
| 2010/0031152 A1* | 2/2010 | Villaron et al. | 715/731 |
| 2010/0122171 A1 | 5/2010 | Bauchot et al. | |
| 2010/0185604 A1* | 7/2010 | Keohane et al. | 707/722 |
| 2011/0209056 A1 | 8/2011 | Choudhary et al. | |
| 2013/0007579 A1* | 1/2013 | Dancy et al. | 715/205 |
| 2013/0031208 A1 | 1/2013 | Linton et al. | |

OTHER PUBLICATIONS

"Dynamic PowerPoint", Published on: May 9, 2005, Available at: http://www.pptmagic.com/articles/dynamicppt.htm.

"Organize Your Slides into Sections", Retrieved on: Apr. 2, 2013, Available at: http://office.microsoft.com/en-us/powerpoint-help/organize-your-slides-into-sections-HA010344969.aspx.

International Search Report, dated Mar. 3, 2015 cited in Appln No. PCT/US2014/040159, 14 pgs.

Microsoft PowerPoint 2000 At a Glance, The Right Answers, Right Now; Published by Microsoft Press; Copyright 1999 by Perspection, Inc.; 35 pages.

"Written Opinion Received for PCT Application No. PCT/US2014/040159", Mailed Date: Jul. 6, 2015, 8 Pages.

"International Preliminary Report on Patentability Issued in PCT Application No. PCT/US2014/040159", Mailed Date: Oct. 2, 2015, 9 Pages.

* cited by examiner

*Resulting Slide 1*

*Resulting Slide 2*

Mobile Computing Device

AUTOMATED SYSTEM FOR ORGANIZING PRESENTATION SLIDES

BACKGROUND

When creating presentation slides using a slide show editor, authors typically place content on slides first and consider structure second. Reorganizing slides to convey a message after the slides have been created and content has been added is difficult, time-consuming, and typically not a consideration for a user who is attempting to generate slides quickly. Current presentation slide editors only provide a tool to present topics, but do not provide a scheme for organizing content and further do not provide an easy way to navigate between various topics within the presentation.

It is with respect to these and other general considerations that embodiments have been made. Also, although relatively specific problems have been discussed, it should be understood that the embodiments should not be limited to solving the specific problems identified in the background.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present disclosure provide a method and system for organizing slides and providing navigational elements within the slides using a presentation application such as Microsoft PowerPoint®. For example, a presentation application initially prompts a creator to provide the editor with a basic outline, or structure, of the presentation such as a title, and subheadings that are considered to be main sections of the presentation. The presentation application then generates slides corresponding to the subheadings provided by the creator, wherein the slides include navigational (i.e. linkable) elements that enable easy linking between subheadings within the presentation. Prompting the creator to first enter a structure enables the creator to consider the message to be conveyed, thereby eliminating a potential massive reorganization of the presentation after content has been added.

Embodiments may be implemented as a computer process, a computing system or as an article of manufacture.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1A:
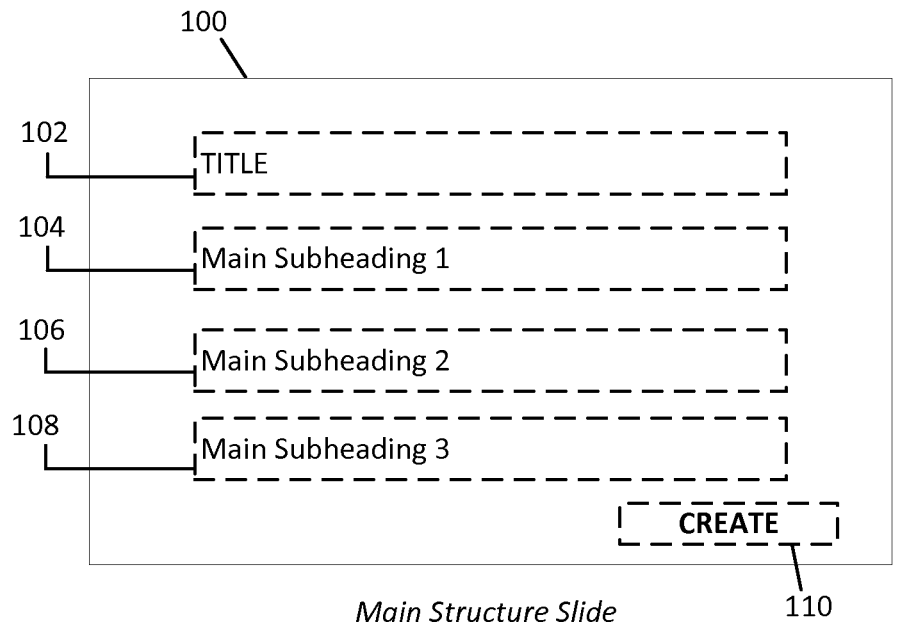
FIG. 1A illustrates a main structure slide.

FIG. 1A illustrates a main structure slide 100 of a presentation application such as Microsoft PowerPoint®. As shown, the main structure slide 100 includes several dialogue boxes for adding a title 102, a first subheading 104, a second subheading 106, a third subheading 108, and a 'create' button 110 to generate presentation slides using the inputs entered. The main structure slide 100 may further include an interface for adding more subheadings and/or deleting subheadings.

Figure 1B:
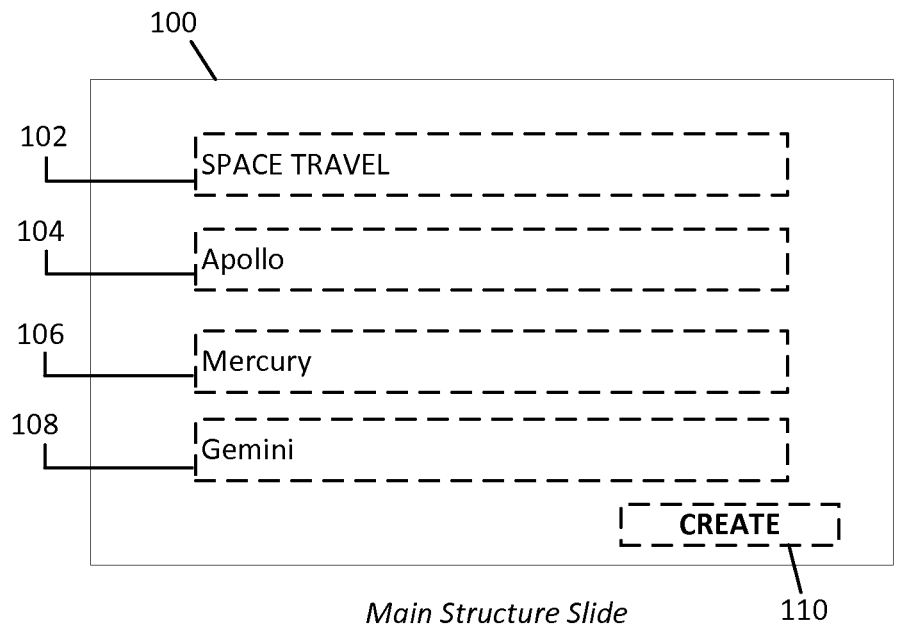
FIG. 1B illustrates a populated main structure slide.

FIG. 1B illustrates a populated main structure slide 100. In this example, 'Space Travel' is input as the title 102, 'Apollo' is input as the first subheading 104, 'Mercury' is input as the second subheading 106, and 'Gemini' is input as the third subheading 108.

Figure 2A:
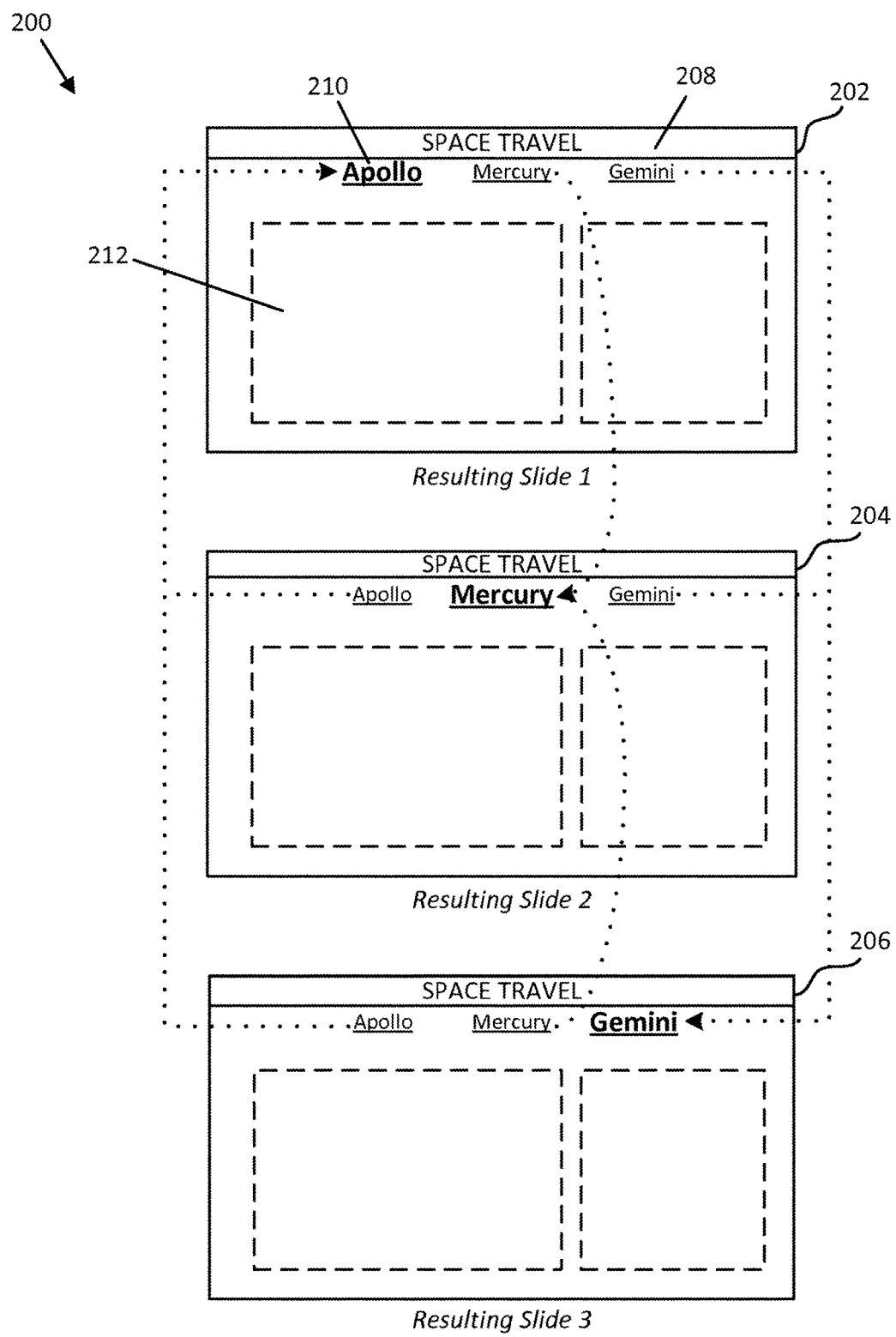
FIG. 2A illustrates slides generated using the automated title and subtitling system.

FIG. 2A illustrates slides 200 that are automatically generated using the automated title and subtitling system. As shown, three resulting slides 200 and navigational elements are automatically generated. Each of the resulting slides 200 represents one of the subheadings input into the main structure slide, as shown and described with respect to FIGS. 1A and 1B. Thus, in this example, three subheadings were input and accordingly, three main resulting slides were generated. Resulting slide 202 represents the main 'Apollo' slide, resulting slide 204 represents the main 'Mercury' slide, and resulting slide 206 represents the main 'Gemini' slide.

Furthermore, one or more children slides may be generated that follow and correspond to each main or parent slide. For example, the 'Apollo' parent slide 202 may be followed by slides 2-7 and slide 8 may represent the 'Mercury' slide 204. In such an example, slides 2-7 are children slides of the 'Apollo' parent slide 202 while the 'Mercury' slide 204 is another parent slide. Furthermore, the 'Apollo' parent slide 202 and slides 2-7 are grouped together in a section. Accordingly, the 'Mercury' slide 204, and any subsequent children slides are combined in a separate section. The parent/child slide relationship is illustrated in further detail with respect to FIG. 2B.

Each of the slides 200 has several areas: a title area 208, a linkable subheading area 210, and a content area 212. In this embodiment, the title area 208 represents the title of the presentation, 'Space Travel', as entered in the main structure slide shown in FIG. 1B. The title area 208 may be included on each slide, or alternatively it may be included on the parent slides and excluded from the children slides.

The linkable subheading area 210 includes the names of each subheading as entered in the main structure slide. Each subheading is automatically linked to its particular section, thereby allowing easy navigation from one section to another by clicking on the desired link. Linking is discussed in further detail below. In this example, the emphasized, or bolded, subheading in the linkable subheading area 210 indicates the name of the particular section to which the slide belongs. Accordingly, the emphasized subheading indicates the present section. For example, in slide 202, 'Apollo' is emphasized in bold and appears as a larger font which indicates that the displayed slide is in the 'Apollo' section. Likewise, the emphasized 'Mercury' subheading in slide 204 indicates that it corresponds to the 'Mercury' section, and the emphasized 'Gemini' subheading in slide 206 indicates that it corresponds to the 'Gemini' section. Thus, if there are several children slides following slide 202, 'Apollo' will be highlighted on each 'Apollo' child slide, indicating that the slide displayed is in the 'Apollo' section of the presentation. Additionally, each 'Apollo' child slide will include linkable elements to the 'Mercury' and 'Gemini' sections.

As discussed above, each of the subheadings in the subheading area 210 is automatically linked such that a user may click on a subheading and be taken directly to the parent slide of that section in the presentation. While a bolded and underlined link is shown, it is understood that alternative methods of emphasizing the current section are included within the invention, including italics, font size, text color, background color, and other methods known to those skilled in the art. The linking is depicted by the dotted line. For example, if the 'Apollo' parent slide 202 is displayed, the 'Gemini' hyperlink can be selected and accordingly, the Gemini slide 206 will be displayed. Alternatively, in some embodiments, the linked subheading may be modified to allow linking to a slide other than the parent slide. The linked subheadings feature makes navigation between sections in large presentations easy. Furthermore, this feature is available while the presentation is operating in presentation mode.

Also in this embodiment, the content area 212 represents a placeholder for text, images, or video. In this embodiment, the content area is depicted by two boxes outlined by a dashed line. In some embodiments, the content area 212 is depicted by one box, and in other embodiments the content area 212 is depicted by several boxes.

Figure 2B:
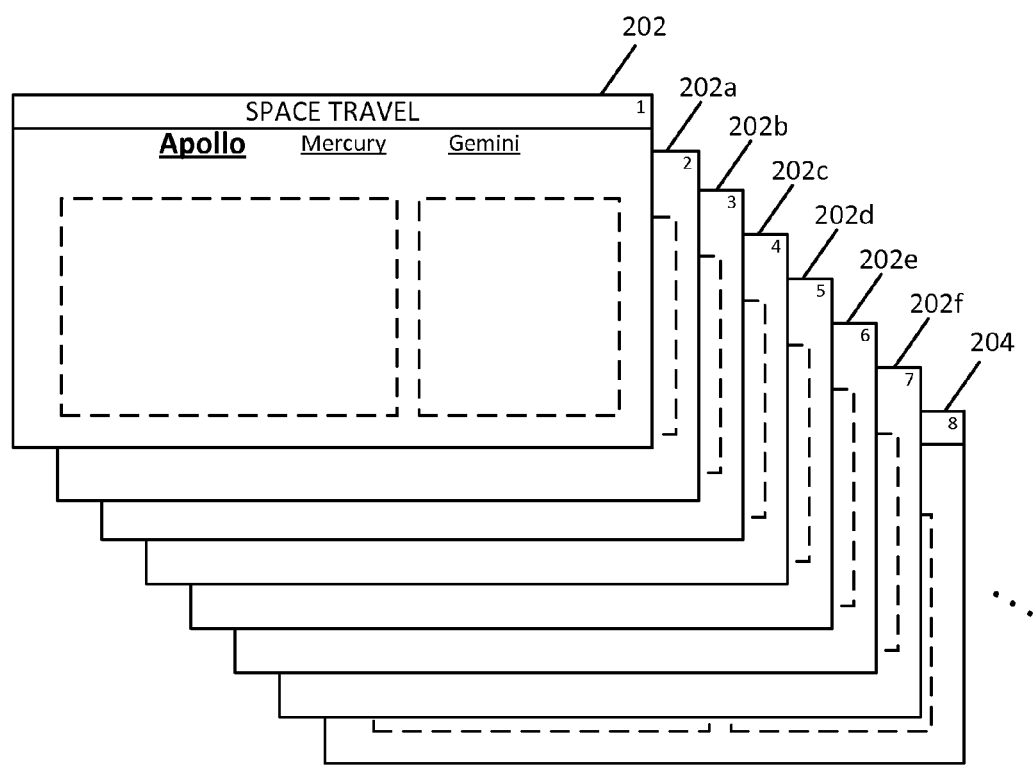
FIG. 2B illustrates a parent slide and children slides generated using the automated title and subtitling system.

FIG. 2B illustrates a parent slide and children slides generated using the automated title and subtitling system. As described with respect to FIG. 2A, the presentation application generated parent slides titled 'Apollo,' 'Mercury,' and 'Gemini' as well as children slides following each parent slide. This embodiment illustrates the 'Apollo' parent slide 202 followed by its six children slides 202a-202f. Additionally shown in this example is the parent 'Mercury' slide 204 that follows the children slides 202a-202f. As shown in this example, children slides 202a-202f are grouped within a section corresponding to the 'Apollo' parent slide 202, and the 'Mercury' slide 204 and its children slides (not shown) that correspond to a separate section.

Figure 3A:
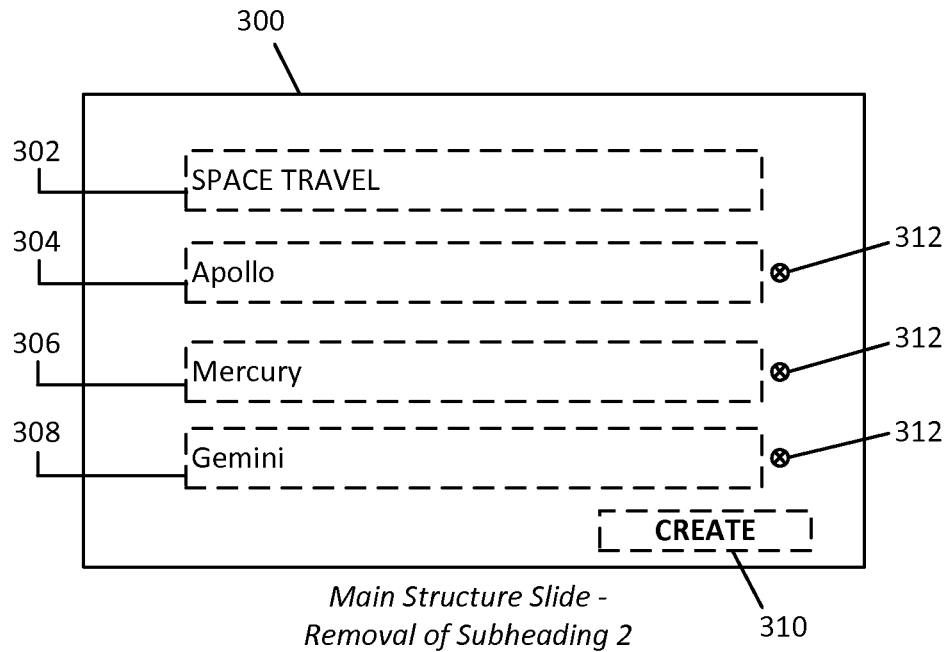
FIG. 3A illustrates removing a subheading on a main structure slide.

FIG. 3A illustrates removing a subheading on a main structure slide 300. As discussed above, the exemplary main structure slide 300 includes several dialogue boxes for adding a title 302, a first subheading 304, a second subheading 306, a third subheading 308, and a 'create' button 310 to generate presentation slides. As shown in FIG. 1A, the first subheading 304, second subheading 306, and third subheading 308 were populated with 'Apollo,' 'Mercury,' and 'Gemini,' respectively. In this example, the second subheading 306 populated with 'Mercury' is to be deleted. In this embodiment, there is a delete button 312 corresponding to each dialogue box that deletes that particular subheading.

Figure 3B:
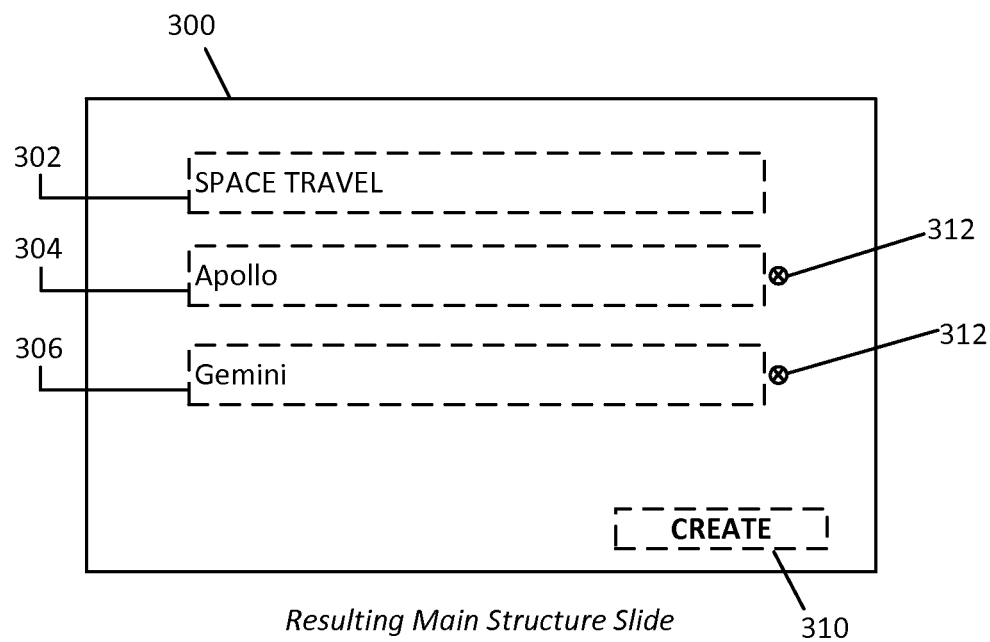
FIG. 3B illustrates a resulting main structure slide after removal of a subheading.

FIG. 3B illustrates a resulting main structure slide 300 after removal of the 'Mercury' subheading (e.g., in response to a user selecting the delete button 312 adjacent the 'Mercury' subheading). In this example, the main structure slide 300 now includes two subheadings: the first subheading 304 titled 'Apollo' and a second subheading 306 now titled 'Gemini.'

Figure 4:
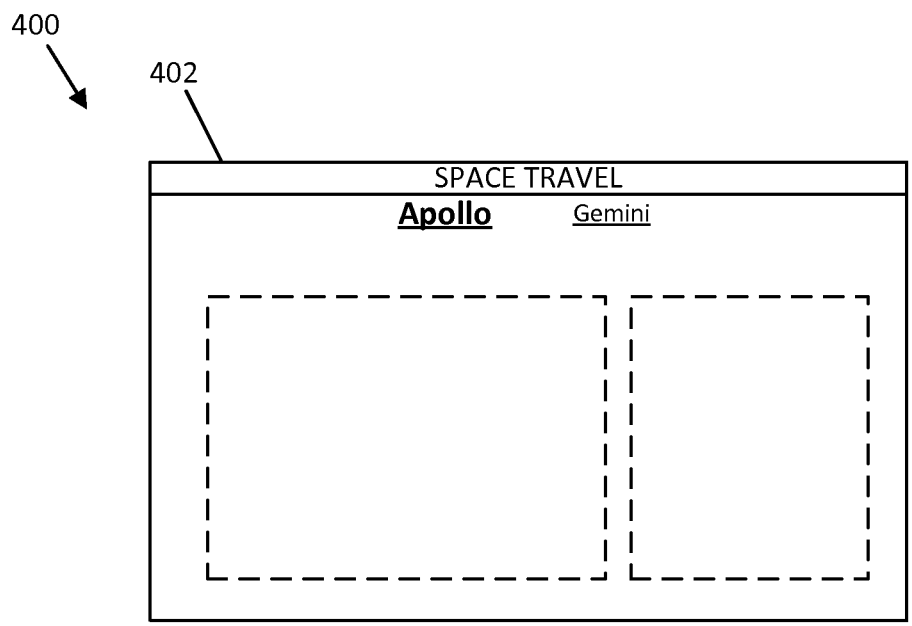
FIG. 4 illustrates slides generated after removing a subheading on the main structure slide.
Figure 4:
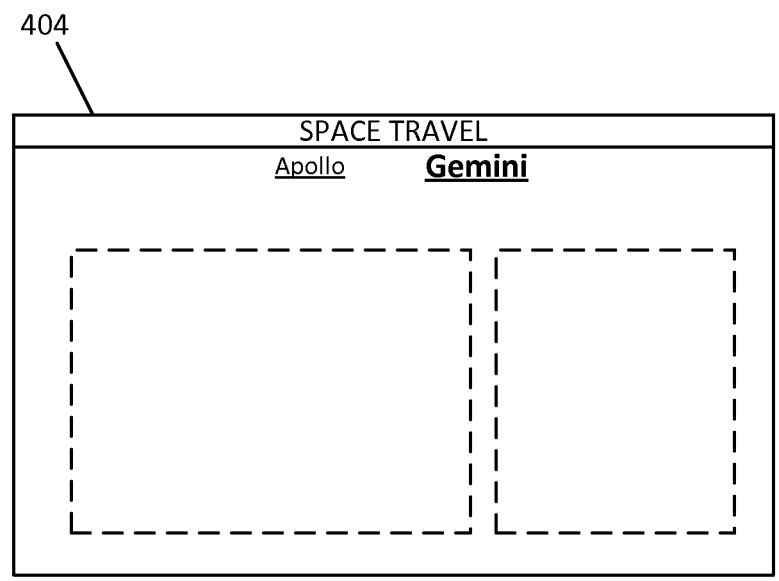

FIG. 4 illustrates slides 400 generated after removing a subheading on the main structure slide. As shown, there are two slides 400 generated: a first slide 402 corresponding to the first subheading and a second slide 404 corresponding to the second subheading. In this example, three subheadings were originally entered as shown and described with reference to FIG. 1. Subsequently, the second subheading titled 'Mercury' was deleted as shown and described with reference to FIG. 3. Accordingly, two slides 400 were generated, excluding the 'Mercury' slide which was deleted (along with any related children slides). Therefore, resulting slide 402 represents the main 'Apollo' slide and resulting slide 404 represents the main 'Gemini' slide. Furthermore, the 'Mercury' link has been removed from the subheading area 210 of the resulting main slides 402 and 404.

In some embodiments, a user may delete a subheading after content has been added to children slides in that section. In this instance, the content may be preserved by adding or assigning the children slides to a new section or an existing section. In either example, the user may manually delete or re-arrange these slides accordingly. Alternatively, the user has the option to re-insert the deleted section and add the corresponding children slide(s) thereto.

Figure 5:
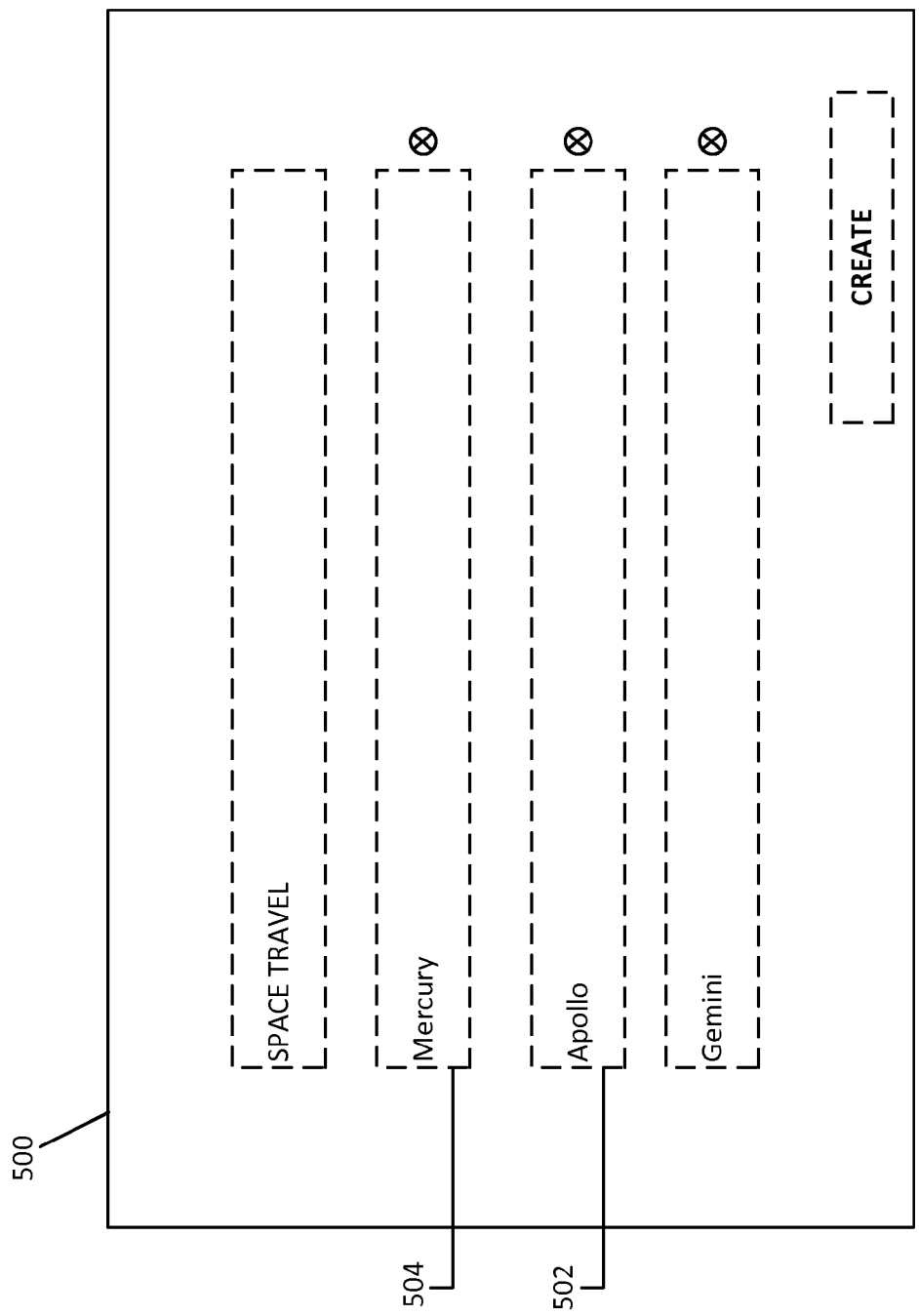
FIG. 5 illustrates reordering subheadings on the main structure slide.

FIG. 5 illustrates reordering subheadings on the main structure slide 500. As shown, the 'Apollo' subheading 502 is now reordered such that it is now located below the 'Mercury' subheading 504. In some embodiments, the reordering is done by a drag and drop operation while in other embodiments, reordering is done by deleting and re-entering text accordingly. Alternatively or additionally, up and down arrows are provided next to each subheading for reordering accordingly. Furthermore, it is understood that any reordering of the parent slides will also correspond to a reordering of the corresponding children slides.

Figure 6:
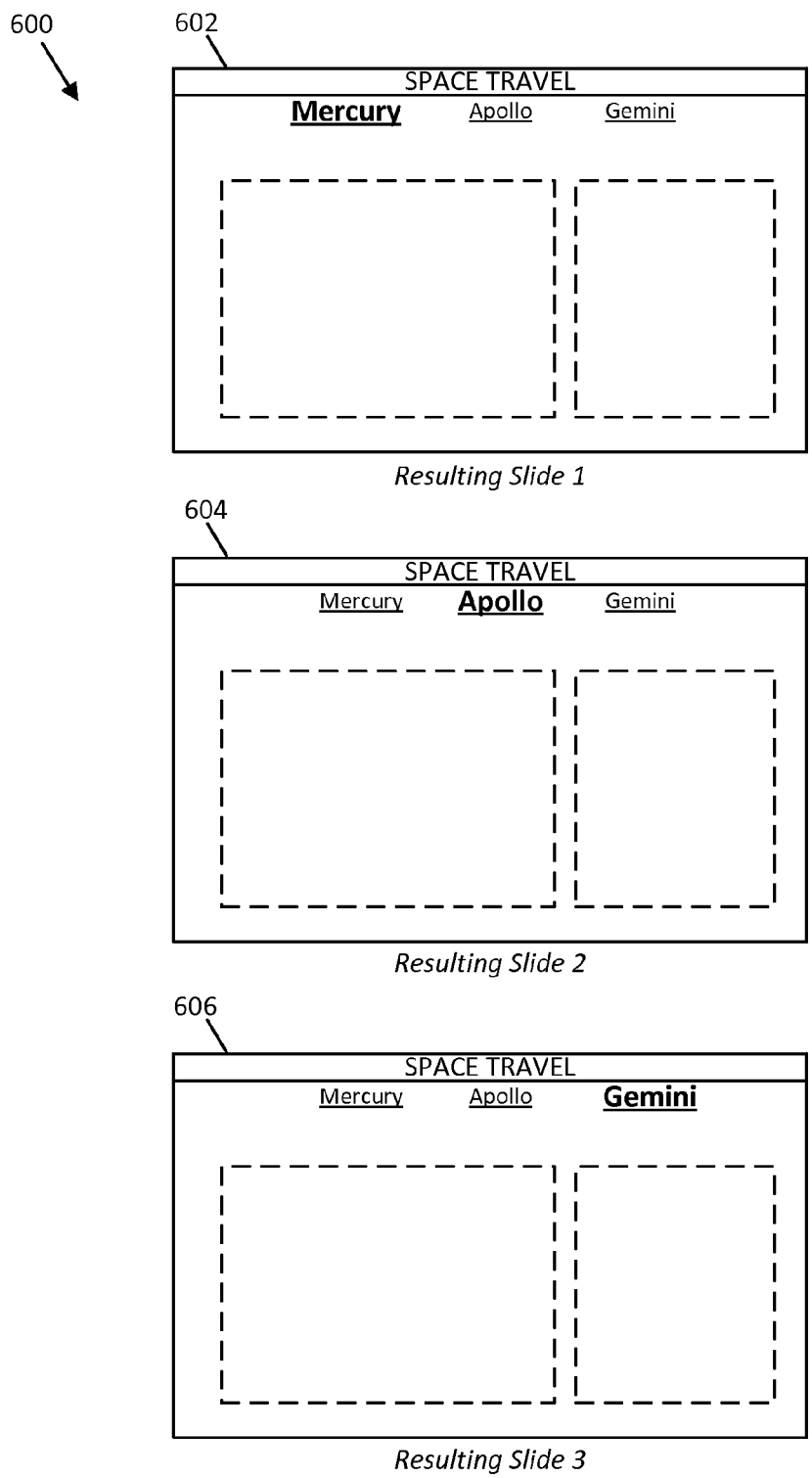
FIG. 6 illustrates slides generated after reordering subheadings on the main structure slide.

FIG. 6 illustrates slides 600 generated after reordering subheadings on the main structure slide. As shown, there are three resulting slides 600 generated: a first resulting slide 602, a second resulting slide 604, and a third resulting slide 606. Each of the resulting slides 600 represents one of the subheadings. Additionally, the slides 600 are reordered according to the new order as shown and described with reference to in FIG. 5. Thus, in this example, resulting slide 602 now represents the main 'Mercury' slide, the following resulting slide 604 represents the main 'Apollo' slide, and the final resulting slide 606 represents the main 'Gemini' slide. Additionally, the subheading links within the subheading area 210 are reordered accordingly. As discussed above, each subheading link provides a link to a corresponding main or parent slide.

Alternatively, the concept of an automated system for organizing presentation slides disclosed herein can be applied to generate section headings and navigational elements to an existing slide deck. For example, the system and method disclosed herein may be used to analyze an existing slide deck to determine topic sections and generate navigational elements on each slide. In one example, the system analyzes cues on each slide such as changes in style, text, images, designs, etc., and determines section headings based on those cues. The system thereafter generates navigational elements on each slide in the slide deck.

Figure 7:
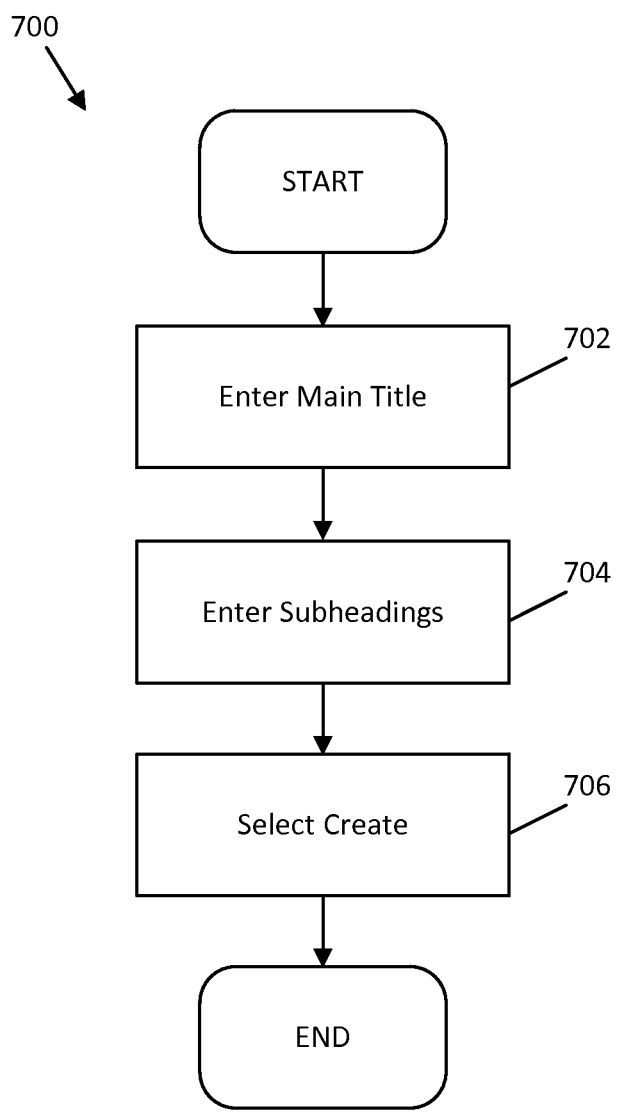
FIG. 7 illustrates a method for creating and organizing a new presentation using a main structure slide in a presentation application.

FIG. 7 illustrates a method 700 for creating and organizing a new presentation using a main structure slide in a presentation application. As should be appreciated, the particular steps of method 700 and the following methods described below are not exclusive and, as will be understood by those skilled in the art, the particular ordering of steps as described herein is not intended to limit the method, e.g., steps may be performed in differing order, additional steps may be performed, and disclosed steps may be excluded without departing from the spirit of the present disclosure.

This method 700 begins at operation 702 in which a presentation user first enters a title 702 in the title dialogue box as shown and described with reference to FIG. 1. Next, the method 700 moves to operation 704 in which the user enters at least one subheading in the main structure slide. As discussed above, each subheading represents different sections within the presentation that are each linkable for easy navigation within the presentation. The method 700 then concludes with operation 706 wherein the user selects the create button to commence slide generation.

Figure 8:
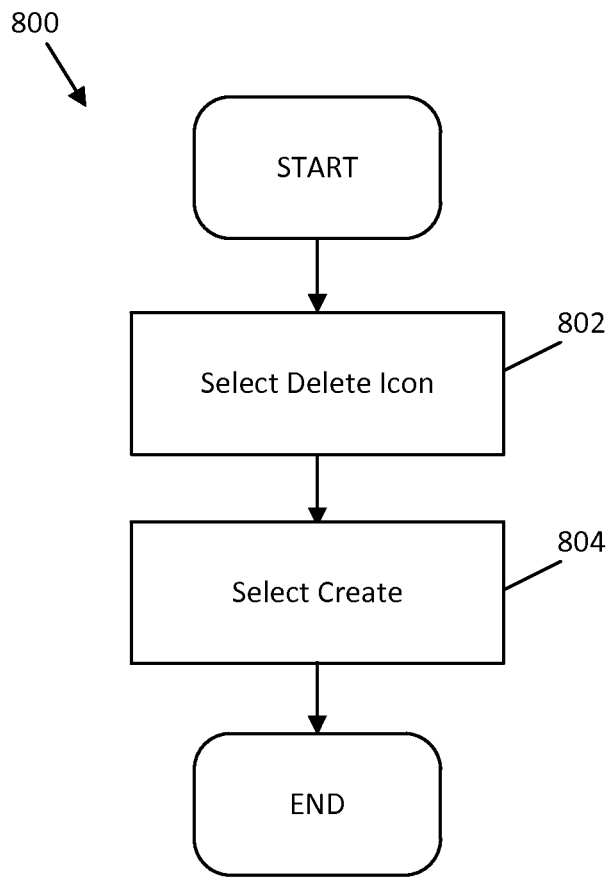
FIG. 8 illustrates a method for deleting subheadings on a main structure slide in a presentation application.

FIG. 8 illustrates a method 800 for deleting subheadings on a main structure slide in a presentation application. The method 800 begins at operation 802 in which a presentation user selects the delete button next to a subheading dialogue box in the main structure slide. Operation 802 can be repeated for as many subheadings as the user wants to delete. Alternatively, the user can manually delete the text from the dialogue box to delete a particular subheading. Next, the method 800 proceeds to operation 804 wherein the user selects the create button to commence slide generation that excludes the deleted slide(s).

Figure 9:
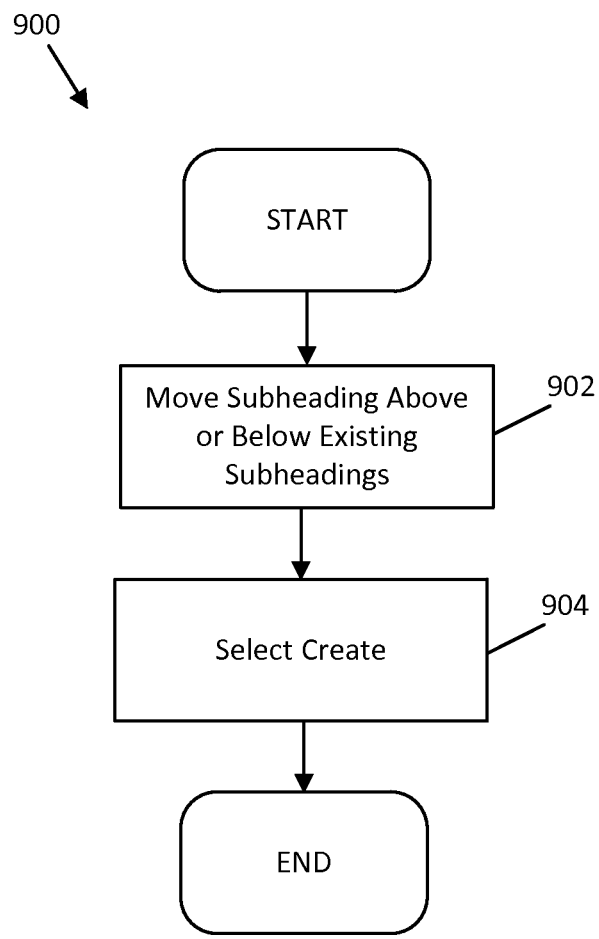
FIG. 9 illustrates a method for reordering subheadings on a main structure slide in a presentation application.

FIG. 9 illustrates a method 900 for reordering subheadings on a main structure slide in a presentation application. The method 900 begins at operation 902 in which a presentation creator moves an already existing subheading above or below another existing subheading (e.g., by dragging and dropping the subheading on the display). Operation 902 is repeated until the subheadings are suitably arranged. Next, the method 900 proceeds to operation 904 wherein the user selects the create button to commence slide generation that incorporates the newly reordered slides.

Figure 10:
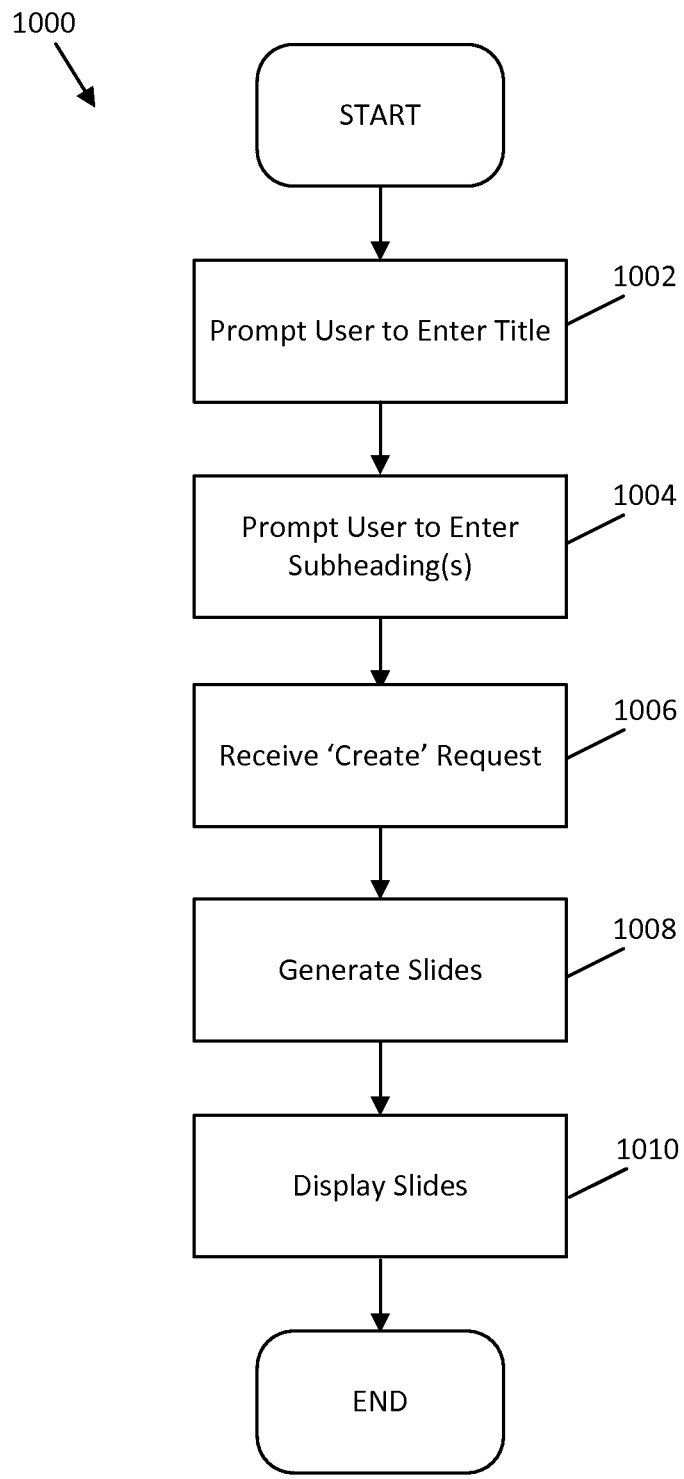
FIG. 10 illustrates a method for creating and organizing a new presentation using a main structure slide by a presentation application.

FIG. 10 illustrates a method 1000 for creating and organizing a new presentation using a main structure slide by a presentation application. The method 1000 begins at operation 1002 in which the presentation application prompts a user to enter a title in the main structure slide as shown and described with respect to FIG. 1. Next in operation 1004, the presentation application prompts the user to enter at least one subheading which represents section headings within the presentation. Next, the presentation application receives a create request 1006. In this example, a create request 1006 instructs the presentation application to generate slides that include the user inputs as requested in operations 1002 and 1004. For example, the slides generated may include a title, as requested from the user in operation 1002 and each subheading, as requested from the user in operation 1004. Additionally, the create request 1006 hyperlinks each subheading that is located in the subheading area (see FIG. 2, ref. 210) on each slide to make a navigational presentation based on user inputs. Next, in operation 1008, the presentation application generates the slides including the content, hyperlinked sections, and title on each slide. Next in operation 1010, the presentation application displays the generated slides including a title and navigational elements such as hyperlinked subheadings for each slide.

Figure 11:
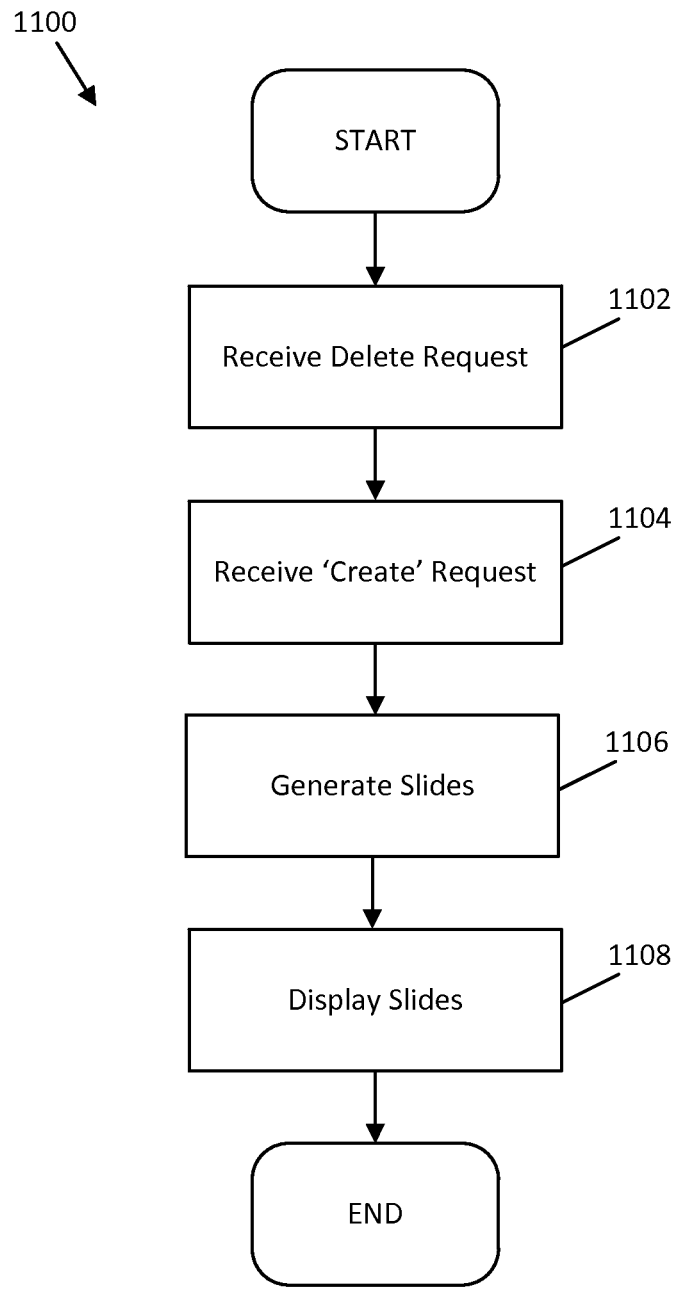
FIG. 11 illustrates a method for deleting subheadings using a main structure slide by a presentation application.

FIG. 11 illustrates a method 1100 for deleting subheadings using a main structure slide by a presentation application. The method 1100 begins at operation 1102 in which the presentation application receives a request to delete a subheading. Operation 1102 may be repeated for as many delete requests sent by the user to the presentation application. Next, the presentation application receives a create request 1104 that instructs the presentation application to generate slides that exclude the deleted slides. Additionally, upon receiving the create request 1104, the presentation application hyperlinks subheadings on the remaining slides to make a navigational presentation while also removing hyperlinks and subheadings that were deleted in operation 1102. Next, in operation 1106, the presentation application generates slides, wherein the slides now exclude the deleted section(s) and associated hyperlinks. Finally, in operation 1108, the presentation application displays the generated slides.

Figure 12:
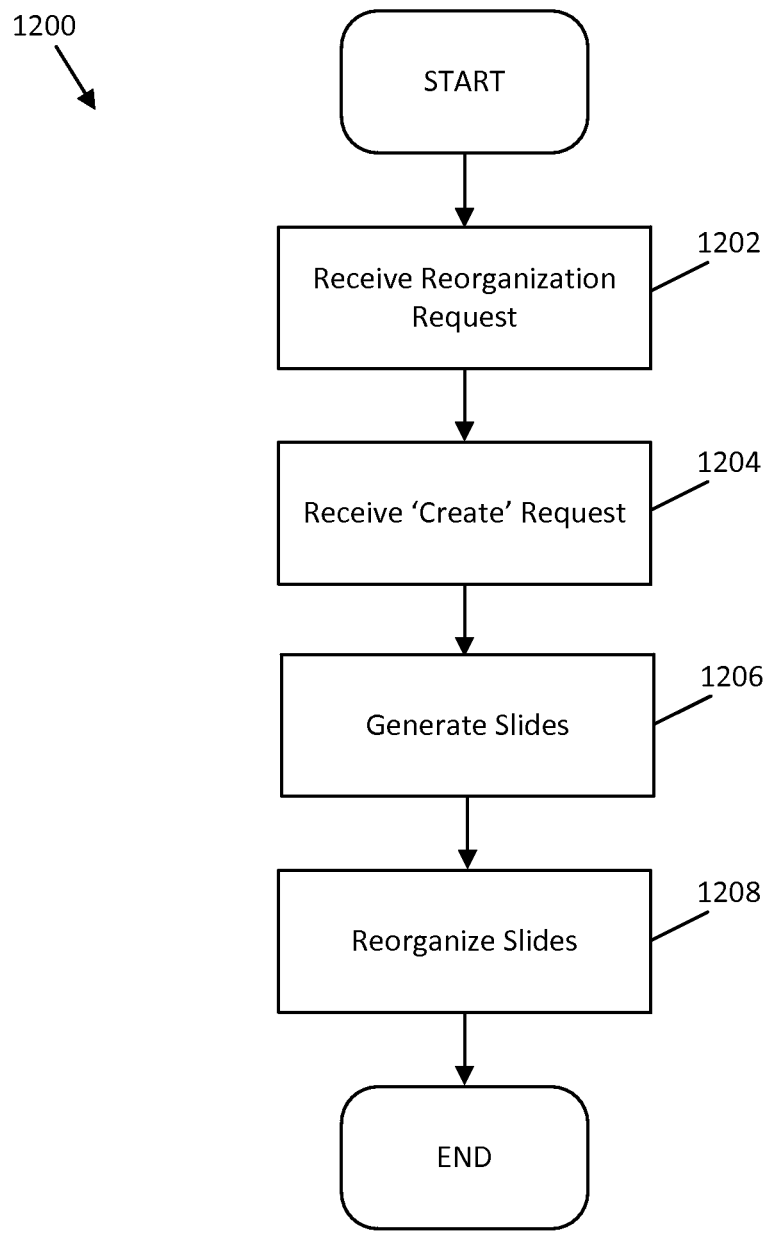
FIG. 12 illustrates a method for reorganizing subheadings using a main structure slide by a presentation application.

FIG. 12 illustrates a method 1200 for reorganizing subheadings using a main structure slide by a presentation application. The method 1200 begins in operation 1202 when the presentation application receives a reorganization request. Receiving a reorganization request 1202 from the user includes receiving instructions for restructuring the presentation accordingly. Next, the presentation application receives a create request 1204 that instructs the presentation application to generate slides that include a new sequence of slides. Next, in operation 1206, the presentation application generates slides, wherein the slides now reflect the new slide order as received by the reorganization request in operation 1202. In operation 1206, the presentation application generates slides including the newly ordered slides as well as new hyperlinks to subheadings reflecting the new slide sequence. Finally, in operation 1208, the presentation application displays the reorganized slides.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 13:
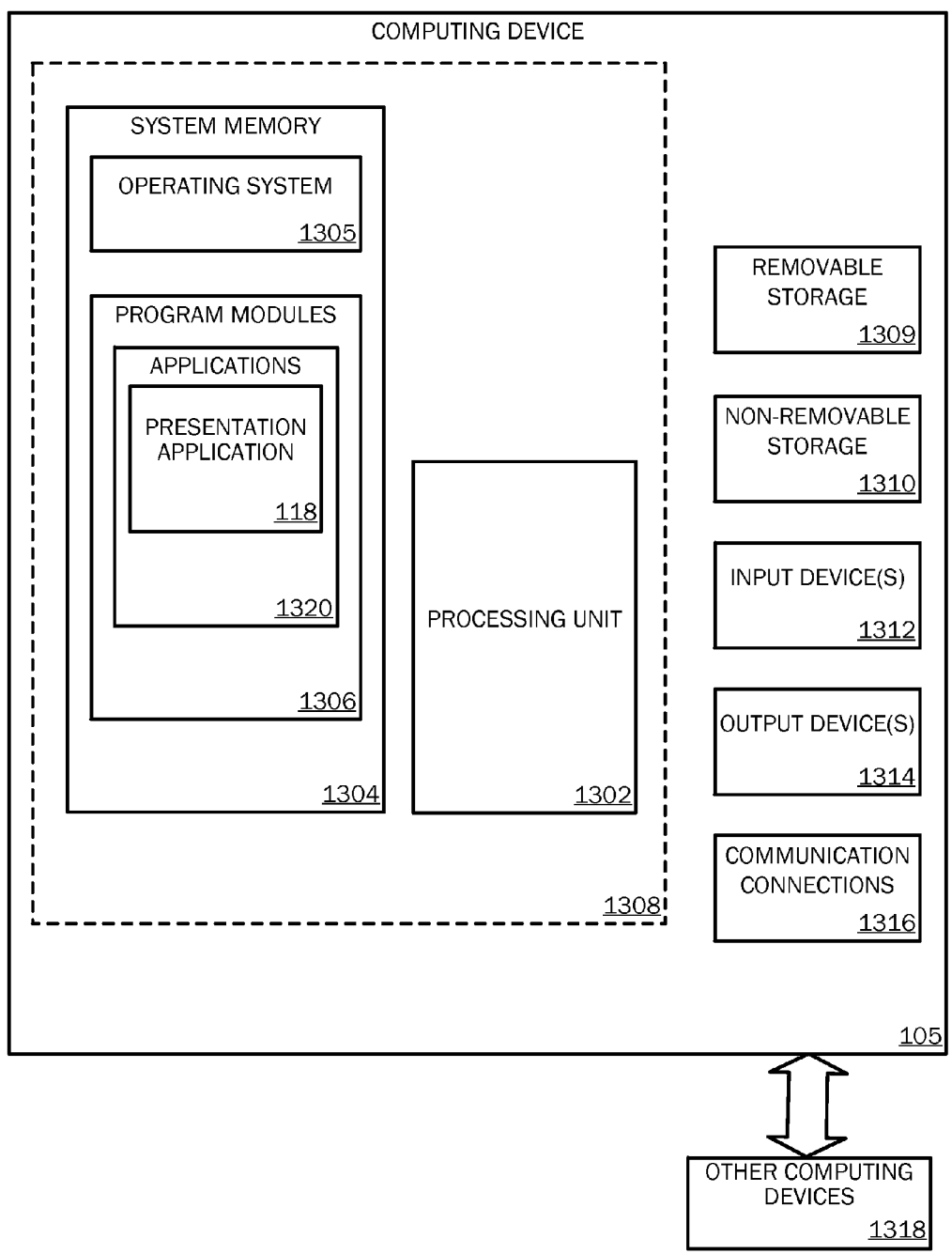
FIG. 13 is a block diagram illustrating example physical components of a computing device with which embodiments of the invention may be practiced.
Figure 14A:
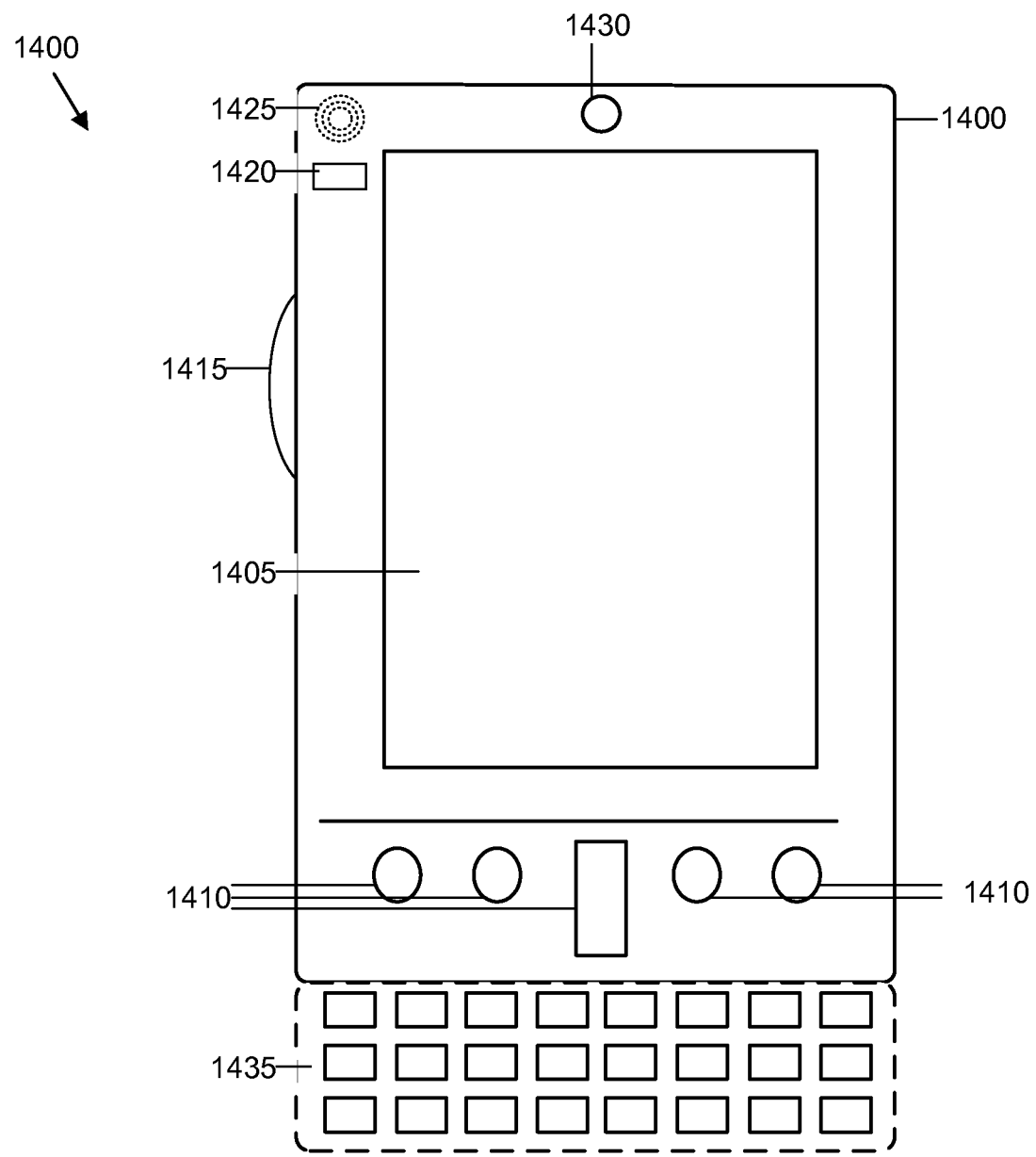
FIGS. 14A and 14B are simplified block diagrams of a mobile computing device with which embodiments of the present invention may be practiced.
Figure 14B:
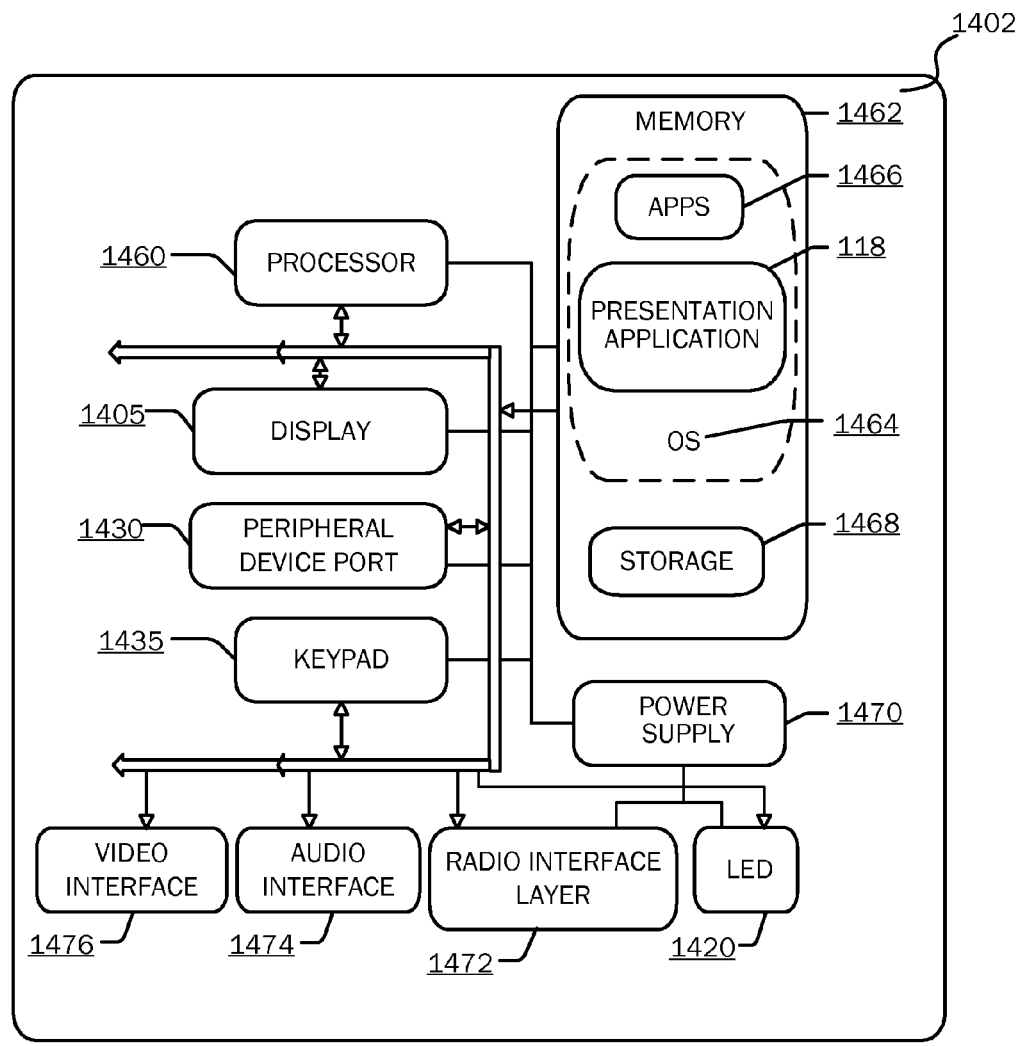
Figure 15:
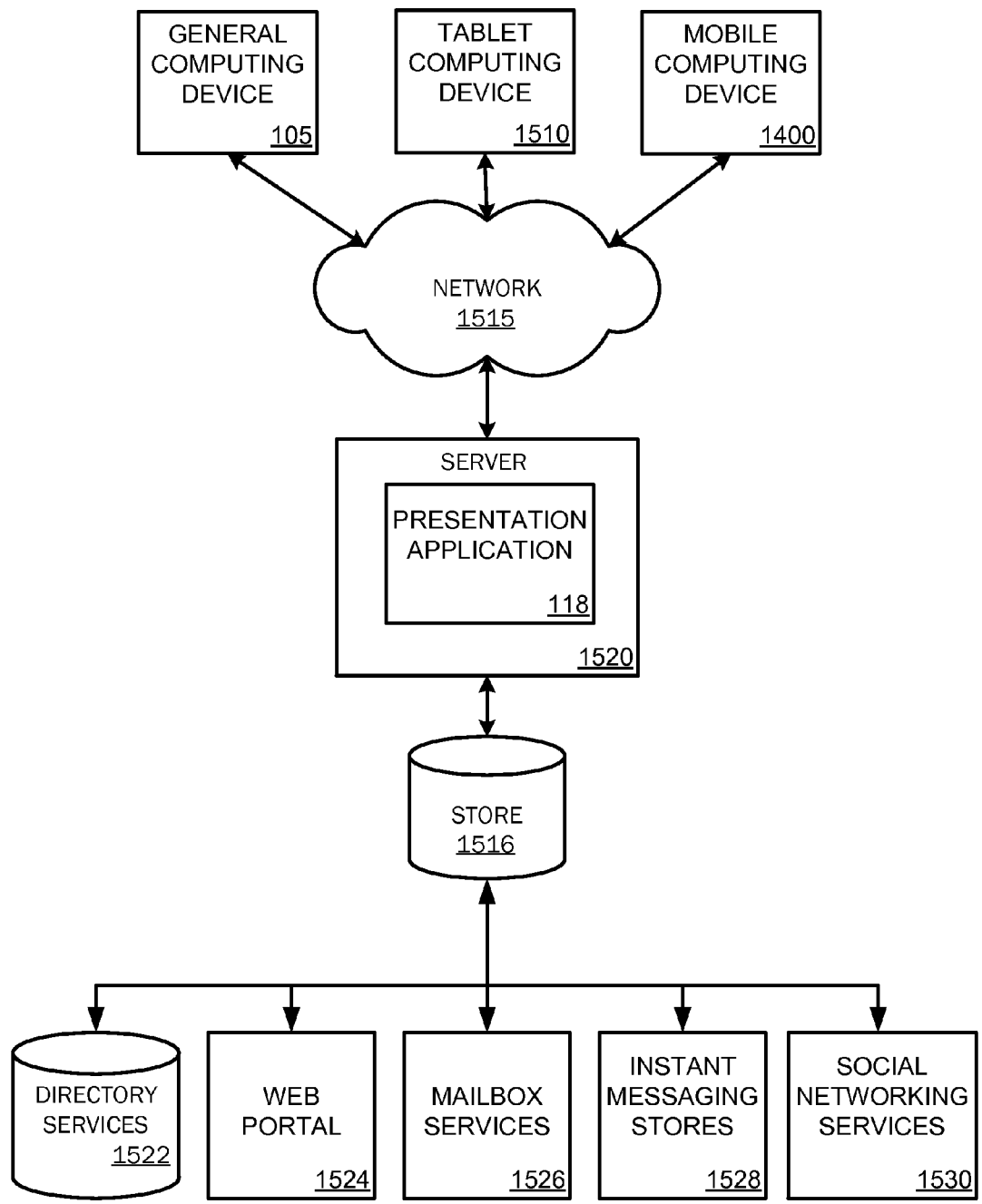
FIG. 15 is a simplified block diagram of a distributed computing system in which embodiments of the present invention may be practiced.

FIGS. 13-15 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

FIG. 13 is a block diagram illustrating physical components (i.e., hardware) of a computing device 105 with which embodiments of the invention may be practiced. The computing device components described below may be suitable for the computing devices described above. In a basic configuration, the computing device 105 may include at least one processing unit 1302 and a system memory 1304. Depending on the configuration and type of computing device, the system memory 1304 may comprise, but is not limited to, volatile storage (e.g., random access memory), non-volatile storage (e.g., read-only memory), flash memory, or any combination of such memories. The system memory 1304 may include an operating system 1305 and one or more program modules 1306 suitable for running software applications 1320 such as a presentation application 118. The operating system 1305, for example, may be suitable for controlling the operation of the computing device 105. Furthermore, embodiments of the invention may be practiced in conjunction with a graphics library, other operating systems, or any other application program and is not limited to any particular application or system. This basic configuration is illustrated in FIG. 13 by those components within a dashed line 1308. The computing device 105 may have additional features or functionality. For example, the computing device 105 may also include additional data storage devices (removable and/or non-removable) such as, for example, magnetic disks, optical disks, or tape. Such additional storage is illustrated in FIG. 13 by a removable storage device 1309 and a non-removable storage device 1310.

As stated above, a number of program modules and data files may be stored in the system memory 1304. While executing on the processing unit 1302, the program modules 1306 (e.g., the presentation application 118) may perform processes including, but not limited to, one or more of the stages of the methods 700-1200 illustrated in FIGS. 7-12. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 13 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the presentation application 118 may be operated via application-specific logic integrated with other components of the computing device 105 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 105 may also have one or more input device(s) 1312 such as a keyboard, a mouse, a pen, a sound input device, a touch input device, etc. The output device(s) 1314 such as a display, speakers, a printer, etc. may also be included. The aforementioned devices are examples and others may be used. The computing device 105 may include one or more communication connections 1316 allowing communications with other computing devices 1318. Examples of suitable communication connections 1316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1304, the removable storage device 1309, and the non-removable storage device 1310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 105. Any such computer storage media may be part of the computing device 105. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 14A and 14B illustrate a mobile computing device 1400, for example, a mobile telephone, a smart phone, a tablet personal computer 610, a laptop computer, and the like, with which embodiments of the invention may be practiced. With reference to FIG. 14A, one embodiment of a mobile computing device 1400 for implementing the embodiments is illustrated. In a basic configuration, the mobile computing device 1400 is a handheld computer having both input elements and output elements. The mobile computing device 1400 typically includes a display 1405 and one or more input buttons 1410 that allow the user to enter information into the mobile computing device 1400. The display 1405 of the mobile computing device 1400 may also function as an input device (e.g., a touch screen display). If included, an optional side input element 1415 allows further user input. The side input element 1415 may be a rotary switch, a button, or any other type of manual input element. In alternative embodiments, mobile computing device 1400 may incorporate more or less input elements. For example, the display 1405 may not be a touch screen in some embodiments. In yet another alternative embodiment, the mobile computing device 1400 is a portable phone system, such as a cellular phone. The mobile computing device 1400 may also include an optional keypad 1435. Optional keypad 1435 may be a physical keypad or a "soft" keypad generated on the touch screen display. In various embodiments, the output elements include the display 1405 for showing a graphical user interface (GUI), a visual indicator 1420 (e.g., a light emitting diode), and/or an audio transducer 1425 (e.g., a speaker). In some embodiments, the mobile computing device 1400 incorporates a vibration transducer for providing the user with tactile feedback. In yet another embodiment, the mobile computing device 1400 incorporates input and/or output ports, such as an audio input (e.g., a microphone jack), an audio output (e.g., a headphone jack), and a video output (e.g., a HDMI port) for sending signals to or receiving signals from an external device.

FIG. 14B is a block diagram illustrating the architecture of one embodiment of a mobile computing device. That is, the mobile computing device 1400 can incorporate a system (i.e., an architecture) 1402 to implement some embodiments. In one embodiment, the system 1402 is implemented as a "smart phone" capable of running one or more applications (e.g., browser, e-mail, calendaring, contact managers, messaging clients, games, and media clients/players). In some embodiments, the system 1402 is integrated as a computing device, such as an integrated personal digital assistant (PDA) and wireless phone.

One or more application programs 1466 may be loaded into the memory 1462 and run on or in association with the operating system 1464. Examples of the application programs include phone dialer programs, e-mail programs, personal information management (PIM) programs, word processing programs, spreadsheet programs, Internet browser programs, messaging programs, and so forth. The system 1402 also includes a non-volatile storage area 1468 within the memory 1462. The non-volatile storage area 1468 may be used to store persistent information that should not be lost if the system 1402 is powered down. The application programs 1466 may use and store information in the non-volatile storage area 1468, such as e-mail or other messages used by an e-mail application, and the like. A synchronization application (not shown) also resides on the system 1402 and is programmed to interact with a corresponding synchronization application resident on a host computer to keep the information stored in the non-volatile storage area 1468 synchronized with corresponding information stored at the host computer. As should be appreciated, other applications may be loaded into the memory 1462 and run on the mobile computing device 1400, including the presentation application 118 described herein.

The system 1402 has a power supply 1470, which may be implemented as one or more batteries. The power supply 1470 might further include an external power source, such as an AC adapter or a powered docking cradle that supplements or recharges the batteries.

The system 1402 may also include a radio 1472 that performs the function of transmitting and receiving radio frequency communications. The radio 1472 facilitates wireless connectivity between the system 1402 and the "outside world," via a communications carrier or service provider. Transmissions to and from the radio 1472 are conducted under control of the operating system 1464. In other words, communications received by the radio 1472 may be disseminated to the application programs 1466 via the operating system 1464, and vice versa.

The visual indicator 1420 may be used to provide visual notifications, and/or an audio interface 1474 may be used for producing audible notifications via the audio transducer 1425. In the illustrated embodiment, the visual indicator 1420 is a light emitting diode (LED) and the audio transducer 1425 is a speaker. These devices may be directly coupled to the power supply 1470 so that when activated, they remain on for a duration dictated by the notification mechanism even though the processor 1460 and other components might shut down for conserving battery power. The LED may be programmed to remain on indefinitely until the user takes action to indicate the powered-on status of the device. The audio interface 1474 is used to provide audible signals to and receive audible signals from the user. For example, in addition to being coupled to the audio transducer 1425, the audio interface 1474 may also be coupled to a microphone to receive audible input, such as to facilitate a telephone conversation. In accordance with embodiments of the present invention, the microphone may also serve as an audio sensor to facilitate control of notifications, as will be described below. The system 1402 may further include a video interface 1476 that enables an operation of an on-board camera 1430 to record still images, video stream, and the like.

A mobile computing device 1400 implementing the system 1402 may have additional features or functionality. For example, the mobile computing device 1400 may also include additional data storage devices (removable and/or non-removable) such as, magnetic disks, optical disks, or tape. Such additional storage is illustrated in FIG. 14B by the non-volatile storage area 1468.

Data/information generated or captured by the mobile computing device 1400 and stored via the system 1402 may be stored locally on the mobile computing device 1400, as described above, or the data may be stored on any number of storage media that may be accessed by the device via the radio 1472 or via a wired connection between the mobile computing device 1400 and a separate computing device associated with the mobile computing device 1400, for example, a server computer in a distributed computing network, such as the Internet. As should be appreciated such data/information may be accessed via the mobile computing device 1400 via the radio 1472 or via a distributed computing network. Similarly, such data/information may be readily transferred between computing devices for storage and use according to well-known data/information transfer and storage means, including electronic mail and collaborative data/information sharing systems.

FIG. 9 illustrates one embodiment of the architecture of a system for providing detection and grouping of graphics elements in a fixed format document to one or more client devices, as described above. Content developed, interacted with, or edited in association with the presentation application 118 may be stored in different communication channels or other storage types. For example, various documents may be stored using a directory service 1522, a web portal 1524, a mailbox service 1526, an instant messaging store 1528, or a social networking site 1530. The presentation application 118 may use any of these types of systems or the like for enabling data utilization, as described herein. A server 1520 may provide the presentation application 118 to clients. As one example, the server 1520 may be a web server providing the presentation application 118 over the web. The server 1520 may provide the presentation application 118 over the web to clients through a network 1515. By way of example, the client computing device may be implemented as the computing device 105 and embodied in a personal computer, a tablet computing device 1510 and/or a mobile computing device 1400 (e.g., a smart phone). Any of these embodiments of the client computing device 105, 610, 1400 may obtain content from the store 1516.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for generating a presentation using a presentation application, the method comprising:
   receiving, from a user and at a structure slide of the presentation application, a presentation title of the presentation to be generated;
   receiving, from the user and at the structure slide, a plurality of subheadings of the presentation to be generated;
   receiving a create request to generate the presentation;
   in response to receiving the presentation title, the plurality of subheadings, and the create request, automatically generating at least one presentation slide for each subheading received at the structure slide, wherein each generated presentation slide includes a link to each of the plurality of subheadings; and
   displaying the generated presentation slides in the presentation application.

2. The method of claim 1, wherein in response to selection of a link included on a generated presentation slide, displaying a parent slide associated with the selected link.

3. The method of claim 1 wherein:
   each link is contained within a subheading area of each presentation slide; and
   each presentation slide further includes a title bar displaying the received presentation title.

4. The method of claim 2, further comprising:
   receiving a delete request for deleting a first subheading;
   deleting the generated presentation slide corresponding to the first subheading; and
   deleting the subheading link corresponding to the first subheading from each remaining presentation slide.

5. The method of claim 4, wherein the steps of receiving a presentation title, receiving a plurality of subheadings, receiving a create request, and receiving a delete request all occur at the structure slide provided by the presentation application.

6. The method of claim 2 wherein the generated presentation slides are displayed in a display order corresponding to an order in which the plurality of subheadings are received, and wherein the subheading links are displayed on each presentation slide in an order corresponding to the order in which the plurality of subheadings are received, the method further comprising:
   receiving a reorder request for reordering a first subheading after a second subheading;
   reordering the display order of the presentation slides so that a presentation slide corresponding to the first subheading is displayed after a presentation slide corresponding to the second subheading; and
   reordering the subheading links on each presentation slide so that a subheading link corresponding to the first subheading is displayed after a subheading link corresponding to the second subheading.

7. The method of claim 6, wherein the steps of receiving the presentation title, receiving the plurality of subheadings, receiving the create request, and receiving the reorder request all occur at the structure slide provided by the presentation application.

8. The method of claim 2, wherein one subheading link on each presentation slide is emphasized to indicate that the presentation slide corresponds to the emphasized subheading link.

9. The method of claim 8 wherein each presentation slide generated for each received subheading comprises a parent slide corresponding to the received subheading, the method further comprising:
   generating a child slide for a first parent slide, the child slide including a plurality of subheading links for each of the plurality of subheadings received and an emphasized subheading link corresponding to the received subheading of the first parent slide.

10. The method of claim 9, further comprising:
    receiving a delete request for deleting a first subheading corresponding to the first parent slide;
    deleting the first parent slide;
    assigning the child slide to a new parent slide; and
    deleting the subheading link corresponding to the first subheading from each remaining presentation slide.

11. A computer-readable medium storing instructions for generating a presentation using a presentation application, the instructions when executed causing a computing device to perform a method, comprising:
    displaying a main structure slide of the presentation application;
    receiving, from a user and at the main structure slide of the presentation application, a presentation title of the presentation to be generated;

receiving, at the main structure slide, a plurality of subheadings;

receiving a create request to generate the presentation;

in response to receiving the presentation title, the plurality of subheadings, and the create request, automatically generating at least one presentation slide for each subheading received at the main structure slide;

inserting a plurality of subheading links on each presentation slide, wherein each subheading link corresponds to a received subheading; and displaying the plurality of presentation slides in the presentation application.

12. The computer-readable medium of claim 11, wherein one subheading link on each presentation slide is emphasized to indicate that the presentation slide corresponds to the emphasized subheading link.

13. The computer-readable medium of claim 11, further comprising ordering each presentation slide according to an order in which each subheading was received.

14. The computer-readable medium of claim 13, further comprising:

reordering the display order of the presentation slides so that a presentation slide corresponding to the first subheading is displayed after a presentation slide corresponding to the second subheading; and reordering the subheading links on each presentation slide so that a subheading link corresponding to the first subheading is displayed after a subheading link corresponding to the second subheading.

15. The computer-readable medium of claim 11, further comprising:

receiving a delete request for a first subheading;

deleting the generated presentation slide corresponding to the first subheading; and deleting the subheading link corresponding to the first subheading from each remaining presentation slide.

16. A computing system comprising:

at least one processor; and at least one memory storing instructions that when executed by the at least one processor cause the computing system to perform a method for creating and organizing a new presentation in a presentation application, the method comprising:

receiving, from a user and at a structure slide of the presentation application, a presentation title;

receiving, from the user and at the structure slide, a plurality of subheadings of the presentation to be generated;

receiving a create request to generate the presentation;

in response to receiving the presentation title, the plurality of subheadings, and the create request, automatically generating at least one presentation slide for each subheading received at the structure slide, wherein each generated presentation slide includes a link to each of the plurality of subheadings; and displaying the generated presentation slides in the presentation application.

17. The computing system of claim 16, wherein each presentation slide includes a subheading link for each of the plurality of subheadings received.

18. The computing system of claim 17, wherein:

a plurality of subheading links are contained within a subheading area of each presentation slide; and each presentation slide further includes a title bar displaying the received presentation title.

19. The computing system of claim 17, further comprising:

receiving a delete request for deleting a first subheading;

deleting the generated presentation slide corresponding to the first subheading; and deleting the subheading link corresponding to the first subheading from each remaining presentation slide.

20. The computing system of claim 19, wherein the steps of receiving a title, receiving a plurality of subheadings, receiving a create request, and receiving a delete request all occur at the structure slide provided by the presentation application.

* * * * *